US008731923B2

(12) United States Patent
Shu

(10) Patent No.: US 8,731,923 B2
(45) Date of Patent: May 20, 2014

(54) SYSTEM AND METHOD FOR MERGING AUDIO DATA STREAMS FOR USE IN SPEECH RECOGNITION APPLICATIONS

(75) Inventor: Chang-Qing Shu, Orlando, FL (US)

(73) Assignee: Adacel Systems, Inc., Orlando, FL (US)

(*) Notice: Subject to any disclaimer, the term of this patent is extended or adjusted under 35 U.S.C. 154(b) by 637 days.

(21) Appl. No.: 12/860,245

(22) Filed: Aug. 20, 2010

(65) Prior Publication Data
US 2012/0046946 A1 Feb. 23, 2012

(51) Int. Cl.
*G10L 15/00* (2013.01)

(52) U.S. Cl.
USPC ........... 704/243; 704/203; 704/205; 704/206; 704/207

(58) Field of Classification Search
USPC .................................. 704/203, 205–207, 243
See application file for complete search history.

(56) References Cited

U.S. PATENT DOCUMENTS

| | | | |
|---|---|---|---|
| 5,692,059 A | 11/1997 | Kruger | |
| 7,054,810 B2* | 5/2006 | Gao et al. | 704/231 |
| 7,120,477 B2 | 10/2006 | Huang | |
| 7,447,630 B2* | 11/2008 | Liu et al. | 704/228 |
| 7,499,686 B2* | 3/2009 | Sinclair et al. | 455/223 |
| 2003/0018475 A1 | 1/2003 | Basu et al. | 704/270 |
| 2005/0043945 A1* | 2/2005 | Droppo et al. | 704/226 |
| 2005/0185813 A1* | 8/2005 | Sinclair et al. | 381/380 |
| 2007/0258599 A1* | 11/2007 | Mao | 381/71.1 |
| 2007/0280493 A1* | 12/2007 | Abolfathi | 381/321 |
| 2008/0059168 A1* | 3/2008 | Eide | 704/231 |
| 2008/0215651 A1* | 9/2008 | Sawada et al. | 708/205 |
| 2008/0300875 A1* | 12/2008 | Yao et al. | 704/236 |
| 2009/0259469 A1* | 10/2009 | Ma et al. | 704/246 |
| 2010/0049516 A1* | 2/2010 | Talwar et al. | 704/251 |
| 2010/0057452 A1* | 3/2010 | Mukerjee et al. | 704/232 |
| 2010/0204991 A1* | 8/2010 | Ramakrishnan et al. | 704/246 |
| 2011/0026740 A1* | 2/2011 | Abolfathi | 381/151 |
| 2012/0275622 A1* | 11/2012 | Gobeli et al. | 381/93 |

OTHER PUBLICATIONS

Zheng et al. "Air- and Bone-Conductive Integrated Microphones for Robust Speech Detection and Enhancement" 2003.*
Buera et al. "Feature Vector Normalization with Combined Standard and Throat Microphones for Robust ASR" 2004.*
Subramanya et al. "Multisensory processing for speech enhancement and magnitude-normalized spectra for speech modeling" 2008.*
Graciarena et al. "Combining Standard and Throat Microphones for Robust Speech Recognition" 2003.*
Zheng et al. "Multi-Sensory Microphones for Robust Speech Detection, Enhancement and Recognition" 2004.*
Tsuge et al. "Speaker verification method using bone-conduction and air-conduction speech" Dec. 9, 2009.*

(Continued)

*Primary Examiner* — Leonard Saint Cyr
(74) *Attorney, Agent, or Firm* — Allen, Dyer, Doppelt, Milbrath & Gilchrist, P.A.

(57) ABSTRACT

A system and method for merging audio data streams receive audio data streams from separate inputs, independently transform each data stream from the time to the frequency domain, and generate separate feature data sets for the transformed data streams. Feature data from each of the separate feature data sets is selected to form a merged feature data set that is output to a decoder for recognition purposes. The separate inputs can include an ear microphone and a mouth microphone.

13 Claims, 2 Drawing Sheets

(56) References Cited

OTHER PUBLICATIONS

Demiroglu et al. "A Missing Data-based Feature Fusion Strategy for Noise-Robust Automatic Speech Recognition Using Noisy Sensors" 2007.*

Potamianos et al. "Audio-Visual Speech Recognition in Challenging Environments" 2003.*

Jou et al. "Automatic Speech Recognition on Vibrocervigraphic and Electromyographic Signals" 2008.*

Zhu et al. "Multimodal Speech Recognition with Ultrasonic Sensors" 2007.*

Hu. "Multi-Sensor Noise Suppression and Bandwidth Extension for Enhancement of Speech" 2006.*

Zhu. "Multimodal Speech Recognition with Ultrasonic Sensors" 2007.*

Erzin. "Improving Throat Microphone Speech Recognition by Joint Analysis of Throat and Acoustic Microphone Recordings". Sep. 2009.*

Hershey et al. "Model-Based Fusion of Bone and Air Sensors for Speech Enhancement and Robust Speech Recognition". 2004.*

* cited by examiner

SYSTEM AND METHOD FOR MERGING AUDIO DATA STREAMS FOR USE IN SPEECH RECOGNITION APPLICATIONS

FIELD OF THE INVENTION

The present invention relates to the handling of audio data streams in speech recognition engines, and more particularly, to the handling of multiple audio data streams by a front end module.

BACKGROUND

The signal to noise ratio (SNR—in speech recognition, essentially the ratio of the speech component of an acoustic input to the background noise component) is known to impact the accuracy of speech recognition engines. In many applications employing speech recognition, users have little or no control over their acoustic environment, and cannot alter the background noise level to suit their purposes.

U.S. Pat. No. 5,692,059 proposes a two active element in-the-ear microphone system as a possible mechanism for reducing noise levels. However, the '059 patent seems to suggest simply combining the signals from each active element to create a composite signal, which would then be output for use by speech recognition and communication systems.

U.S. Pat. No. 7,120,477 discloses the use of ear microphones (as one of several types of sensors) to increase speech recognition accuracy by outputting a signal indicative of whether a user is speaking. However, the '477 patent only uses data from the ear microphone to identify the starting and ending points of a speech event.

SUMMARY OF THE INVENTION

Based on the foregoing, it is an object of the present invention to provide an improved system and method for merging audio data streams for use in a speech recognition engine.

According to an embodiment of the present invention, a speech recognition system includes a computer system having at least one processor and machine readable memory configured to execute a front end module adapted to receive first and second audio data streams. The front end module is further adapted to transform the audio data streams from the time domain to the frequency domain and independently determine a feature data set for each audio data stream in the frequency domain. The front end module generates a merged feature data set from the first and second feature data sets and outputs the merged feature data set for use by a decoder.

According to an aspect of the present invention, the first audio data stream is from an ear microphone and the second audio data stream is from a mouth microphone.

According to a method aspect, a method for merging at least a first and a second audio data stream for use in a speech recognition application includes transforming the first audio data stream from a time domain to a frequency domain, and transforming the second audio data stream from the time domain to the frequency domain. A first feature data set is determined for the first transformed audio stream for a first range of frequencies, and a second feature data set is determined for the second transformed audio stream for a second range of frequencies differing, at least in part, from the first range of frequencies. Predetermined feature data from the first and second feature data sets is combined to form a merged feature data set.

These and other objects, aspects and advantages of the present invention will be better appreciated in view of the drawings and following detailed description of a preferred embodiment.

DETAILED DESCRIPTION OF A PREFERRED EMBODIMENT

Figure 1:
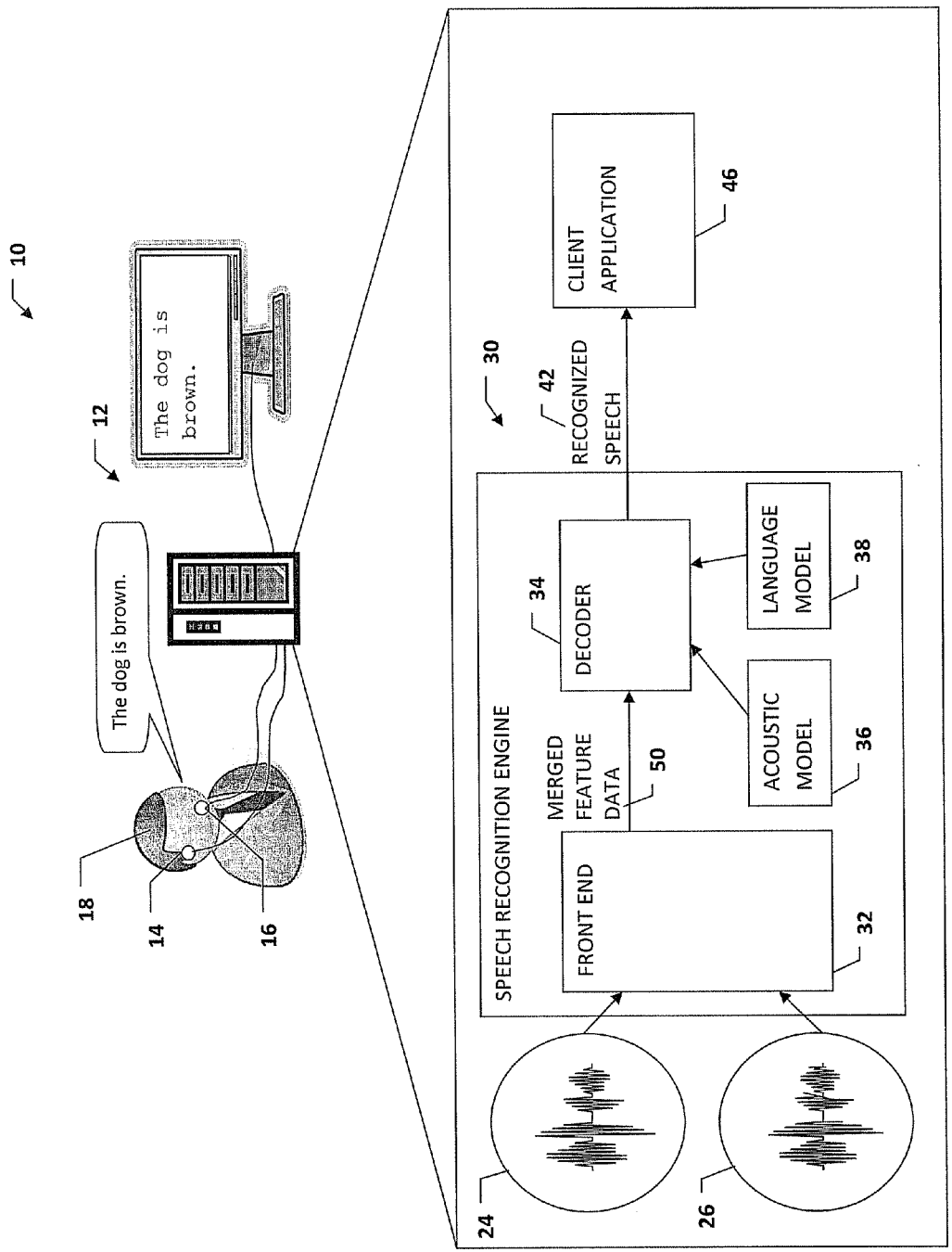
FIG. 1 is an overview of a speech recognition system, according to an embodiment of the present invention.

Referring to FIG. 1, according to an embodiment of the present invention, a speech recognition system includes a computer system 12 connected to first and second microphones 14, 16. The computer system 12 and microphones 14, 16 are configured to detect sounds produced by user 18, such as speech, along with noise from the user's acoustic environment, and convert the sounds and noise into respective first and second audio data streams 24, 26 representative thereof.

"Computer system," as used herein, generically refers to any microprocessor based device or group of devices capable of connection to a microphone, receipt of audio inputs therefrom, and conversion of the audio inputs into digital audio signals. Non-limiting examples of computer systems include personal computers, cellular phones and other personal electronic devices, and computer-based simulation systems. The present invention is not necessarily limited to particular processor types, numbers or designs, to particular code formats or languages, or to particular hardware or software memory media.

The computer system 12 includes at least one processor and machine-readable memory configured to execute a speech recognition engine 30. The speech recognition engine 30 includes a front end module 32, a decoder 34, and acoustic and language models 36, 38. The speech recognition engine 30 is configured to receive the first and second audio data streams 24, 26 and output recognized speech 42 based thereon for use by a client application 46; for example, a word processing program, a simulation program, a game, or a command and control system of a vehicle.

The front end module 32 is configured to receive the first and second audio data streams 24, 26 from the first and second microphones 14, 16, respectively. The front end module transforms each of the audio data streams 24, 26 from the time domain to the frequency domain, determines respective first and second feature data sets for audio data streams 24, 26 and selectively combines the feature data sets to output a merged feature data set 50 to the decoder 34. To ensure proper alignment (e.g., proper time synchronization) between the first and second audio data streams 24, 26, the streams can be advantageously handled analogously to stereo audio inputs, with each stream 24, 26 being assigned to respective even and odd (or left and right, or the like) audio channels. However, other alignment methods could also be used.

The first and second microphones 14, 16 are preferably an ear microphone and a mouth microphone, respectively. The ear microphone is a microphone located at least partially within, and collecting audio input from within, the ear canal. The mouth microphone is a microphone positioned to collect audio input from a user, but not positioned in the ear. The mouth microphone is not necessarily positioned proximate to the mouth. The present invention is not necessarily limited to a particular type or model of microphone, or to a particular extra-auricular position of the mouth microphone. For example, the ear and mouth microphone could be mounted to a common body with the ear microphone inserted in the ear and the mouth microphone extending towards the mouth. Alternately, the mouth microphone could be part of a separate structure, either worn on the user or located separately therefrom.

The ambient noise component of the audio data stream collected from the ear microphone is significantly less than that collected from the mouth microphone, particularly in noisy environments. However, the frequency response of the ear microphone is limited to approximately 50 hertz (Hz) to 4.5 kHz. This limited frequency response is not due to design limitations of existing ear microphones, but rather to the capacity of the human head structure to internally transmit speech sounds above approximately 4.5 kHz.

Although the ear microphone will not reliably detect sound at above 4.5 kHz, the noise levels in many noisy environments are significantly lower at higher frequencies. For example, for audio recorded in an airplane cockpit, the noise level above 4 kHz was found to be approximately 20 decibels (dB) lower than the noise level below 4 kHz. Thus, selectively combining the audio streams from an ear and a mouth microphone can yield significant noise reduction, and therefore increased accuracy.

Although the use of an ear microphone in combination with a mouth microphone is believed to be highly advantageous, the present invention is not necessarily limited thereto. It will be appreciated that aspects of the present invention can used in connection with merging audio data streams from different input sources, in general; and more particularly, where at least one audio data stream is from an input source less affected by noise over a known range of frequencies.

Figure 2:
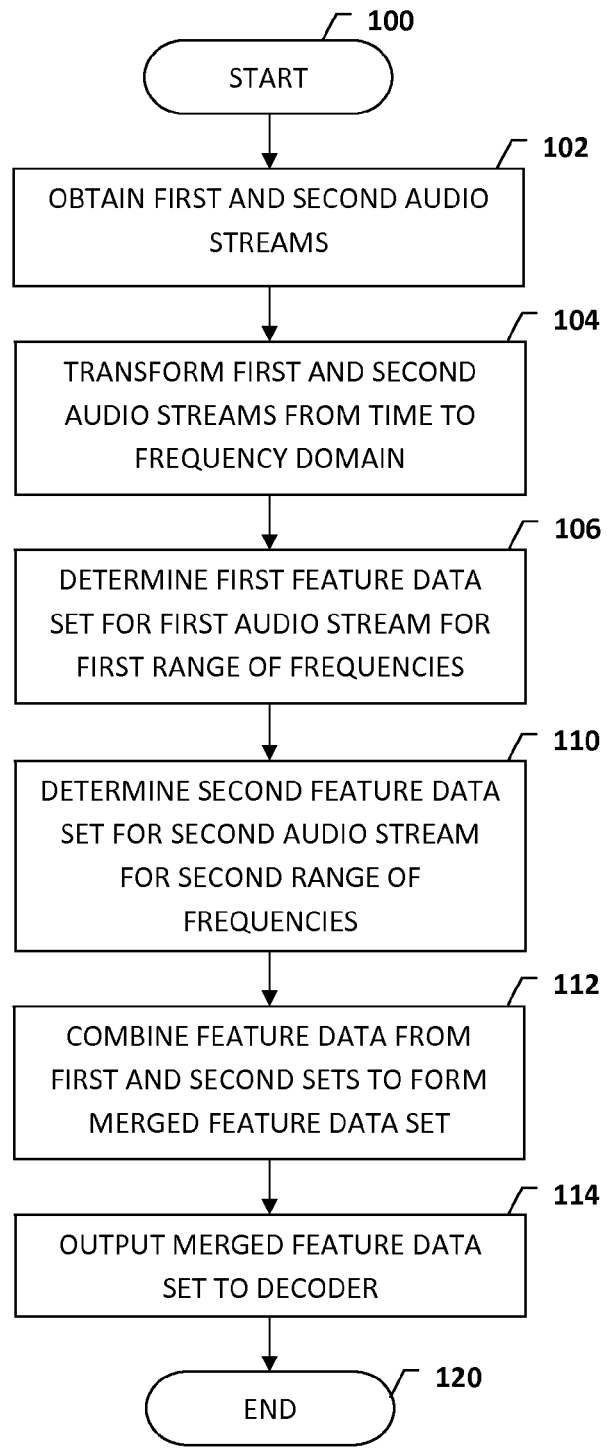
FIG. 2 is a flow diagram of a method for merging audio data streams, according to a method aspect of the present invention.

Referring to FIG. 2, according to a method aspect of the present invention, a method for merging audio data streams starts at block 100. At block 102, first and second audio data streams are obtained. As described above, the first and second audio data streams can be obtained as even and odd channels (e.g., as even and odd channels in a .wav file). Preferably, the first audio data stream will be subject to a lower noise level over a first predetermined range of frequencies. For example, the first audio data stream can be from an ear microphone, with a lower noise level for frequencies below approximately 4.5 kHz.

At block 104, the first and second audio streams are separately transformed from time domain functions to frequency domain functions. Fourier transforms are advantageously employed for this transformation.

At block 106, a first feature data set is determined for the first audio data stream after the transformation. Advantageously, the feature data set is only determined based on the first range of frequencies. In the ear and mouth microphone example, the first range of frequencies is preferably frequencies below approximately 4.5 kHz, and more preferably from approximately 50 Hz to approximately 4.5 kHz.

A second feature data set is determined for the second audio data stream at block 110. Advantageously, the second feature data set is only determined based on the second range of frequencies. In the ear and mouth microphone example, the second range of frequencies is preferably frequencies above approximately 4.5 kHz, and more preferably from approximately 4.5 kHz to approximately 8 kHz. Alternately, there can be a significant overlap between the first and second range of frequencies.

The present invention is not necessarily limited to a particular type of feature data or method for determining the feature data. However, the determination of cepstral coefficients is suitable for feature data. In particular, the first and second feature data sets each include a complete set of cepstral coefficients (e.g., $C_0, C_1 \ldots, C_N$). Each set of cepstral coefficients is therefore independent of the other.

At block 112, the first and second feature data sets are selectively combined to form a merged feature data set. The merged feature data set is advantageously a complete feature data set selectively incorporating predetermined feature data from each of the first and second feature data sets. The selection of feature data from each set is done to optimize recognition accuracy. An exemplary combination for the ear and mouth microphone example, using cepstral coefficients from each feature data set is depicted in Table 1.

TABLE 1

| Merged Feature Data Set | First Feature Data Set | Second Featured Data Set |
| --- | --- | --- |
| $C_{0,M} = C_{0,1}$ | $C_{0,1}$ | $C_{0,2}$ |
| $C_{1,M} = C_{1,1}$ | $C_{1,1}$ | $C_{1,2}$ |
| $C_{2,M} = C_{2,1}$ | $C_{2,1}$ | $C_{2,2}$ |
| $C_{3,M} = C_{3,1}$ | $C_{3,1}$ | $C_{3,2}$ |
| $C_{4,M} = C_{4,1}$ | $C_{4,1}$ | $C_{4,2}$ |
| $C_{5,M} = C_{5,1}$ | $C_{5,1}$ | $C_{5,2}$ |
| $C_{6,M} = C_{6,1}$ | $C_{6,1}$ | $C_{6,2}$ |
| $C_{7,M} = C_{1,2}$ | $C_{7,1}$ | $C_{7,2}$ |
| $C_{8,M} = C_{2,2}$ | $C_{8,1}$ | $C_{8,2}$ |
| $C_{9,M} = C_{3,2}$ | $C_{9,1}$ | $C_{9,2}$ |
| $C_{10,M} = C_{4,2}$ | $C_{10,1}$ | $C_{10,2}$ |
| $C_{11,M} = C_{5,2}$ | $C_{11,1}$ | $C_{11,2}$ |
| $C_{12,M} = C_{6,2}$ | $C_{12,1}$ | $C_{12,2}$ |

Thus, in the foregoing example, the merged feature data set (M) is formed using the zeroeth through sixth cepstral coefficients from the first feature data set (1) as the zeroeth through sixth cepstral coefficients of the merged feature data set, and using the first through sixth cepstral coefficients from the second feature data set (2) as the seventh through twelfth cepstral coefficients of the merged feature data set. Where feature data in the form of cepstral coefficients is employed, other numbers of cepstral coefficients can be used. Preferably, a complete set of coefficients is still generated each audio data stream with their respective ranges of frequencies, with the merged set being formed as a combination of selected cepstral coefficients from each separate feature data set.

Generally, a cepstral coefficient set will include a zeroeth coefficient ($C_0$) and an even number of additional coefficients ($C_1 \ldots C_N$). For instance, in the above example, there is a zeroeth coefficient, and first through twelfth additional coefficients. It is believed to be advantageous to select the additional coefficients of the merged cepstral coefficient set by selecting equal numbers of additional coefficients from the first and second cepstral coefficient sets. More particularly, where the total number of additional coefficients is N, the first N/2 additional coefficients from the first and second cepstral coefficient sets are selected (as in the above example). Alternately, the number of cepstral coefficients selected from each set could be varied. For example, the number of cepstral coefficients selected could be proportional to the respective ranges of frequencies for which feature data was determined.

At block 114, the merged feature data set is output to the decoder and the method ends at block 120. Advantageously, the method of the present invention can be accomplished by a speech recognition engine with relatively limited changes to the front end module, and without needing any changes to the decoder, acoustic model or language model, or in training of the speech recognition engine.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and the claims appended hereto.

What is claimed is:

1. A method for merging at least a first and second audio data stream for use in a speech recognition application, the method comprising:
   transforming the first audio data stream from a time domain to a frequency domain;
   transforming the second audio data stream from the time domain function to the frequency domain;
   determining a first feature data set for the first transformed audio stream for a first range of frequencies;
   determining a second feature data set for the second transformed audio stream for a second range of frequencies; and
   combining predetermined feature data from the first and second feature data sets to form a merged feature data set;
   wherein the first, second and merged feature data sets each have a zeroeth cepstral coefficient and an equal number (N) of additional cepstral coefficients, and the merged feature data set is formed by selecting only a predetermined ratio of only lowest numbered additional cepstral coefficients from the first and second feature data sets; and
   wherein the additional cepstral coefficients of the merged feature data set include, from lowest to highest, first all of the selected additional cepstral coefficients from the first feature data set and then all of the selected additional cepstral coefficients from the second feature data set.

2. The method of claim 1, further comprising capturing the first audio data stream from an ear microphone and capturing the second audio data stream from a mouth microphone.

3. The method of claim 2, wherein in the first and second ranges of frequencies overlap.

4. The method of claim 2, wherein the first and second audio data streams are assigned to respective stereo audio channels.

5. The method of claim 2, wherein the first range of frequencies is from approximately 50 Hz to approximately 4.5 kHz.

6. The method of claim 5, wherein the second range of frequencies is from approximately 4.5 kHz to approximately 8 kHz.

7. The method of claim 1, wherein the first range of frequencies includes lower frequencies than the second range of frequencies, and the second range of frequencies includes higher frequencies than the first range of frequencies.

8. The method of claim 1, wherein combining predetermined feature data includes selecting an equal number of the additional coefficients from the first and second cepstral coefficient sets for inclusion in the merged cepstral coefficient set.

9. The method of claim 8, wherein the first N/2 coefficients are selected from the first and second cepstral coefficient sets.

10. The method of claim 9, wherein N=12 and the first through sixth cepstral coefficients of the first cepstral coefficient set are used as the first through sixth cepstral coefficients of the merged cepstral coefficient set and the first through sixth cepstral coefficients of the second cepstral coefficient set are used as the seventh through twelfth cepstral coefficients of the merged cepstral coefficient set.

11. The method of claim 8, wherein the zeroeth cepstral coefficient of the first cepstral coefficient set is selected as the zeroeth cepstral coefficient of the merged cepstral coefficient set.

12. The method of claim 1, wherein the first and second ranges of frequencies do not completely overlap, and the cepstral coefficients of the first and second feature data sets are determined only for the respective range of frequencies.

13. The method of claim 1, wherein the first N/2 additional cepstral coefficients are selected from the first and second feature data sets.

* * * * *